(12) United States Patent
Sjöö

(10) Patent No.: US 7,568,864 B2
(45) Date of Patent: Aug. 4, 2009

(54) TOOL FOR CHIP REMOVING MACHINING AND A BASIC BODY THEREFOR

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 146 days.

(21) Appl. No.: 11/979,889

(22) Filed: Nov. 9, 2007

(65) Prior Publication Data
US 2008/0131215 A1 Jun. 5, 2008

(30) Foreign Application Priority Data
Nov. 28, 2006 (SE) .................................. 0602557

(51) Int. Cl.
B23B 27/10 (2006.01)
B23B 1/00 (2006.01)

(52) U.S. Cl. ......................................... 407/11; 407/110

(58) Field of Classification Search .................... 407/11, 407/109, 110, 117; 408/56; 409/135, 136; 82/50
See application file for complete search history.

(56) References Cited

U.S. PATENT DOCUMENTS

| | | | | | |
|---|---|---|---|---|---|
| 2,922,219 | A | * | 1/1960 | Scott | 407/87 |
| 3,808,656 | A | * | 5/1974 | Lindskog | 407/11 |
| 3,889,520 | A | * | 6/1975 | Stoferle et al. | 73/37.5 |
| 5,921,724 | A | * | 7/1999 | Erickson et al. | 407/117 |
| 6,705,805 | B2 | * | 3/2004 | Lagerberg | 407/11 |
| 2007/0286689 | A1 | * | 12/2007 | Giannetti | 407/11 |

* cited by examiner

Primary Examiner—Willmon Fridie
(74) Attorney, Agent, or Firm—Drinker Biddle & Reath LLP

(57) ABSTRACT

A tool for chip removing machining, including a replaceable cutting insert and a basic body. The basic body includes a rear fixing part, a front supporting part having an insert seat, and a tightening part situated over the support part, and spaced-apart from the front supporting part by a first gap and from the rear fixing part by a second gap. The tightening part is connected to the basic body via a joint. The joint is formed of at least one elastically resilient material portion and has an axis around which the tightening part is pivoted in order to press the cutting insert against the insert seat by a front finger. The rear fixing part includes an internal channel for feed of a fluid in the forward direction through the basic body. The internal channel extends into a second channel inside the tightening part via a channel section that is entirely or partly housed in a bridge which, like the joint, is formed of the material in the basic body, and which bridges one of the first and second gaps.

14 Claims, 4 Drawing Sheets

TOOL FOR CHIP REMOVING MACHINING AND A BASIC BODY THEREFOR

This application claims priority under 35 U.S.C. § 119 to Sweden Patent Application No. 0602557-7, filed on Nov. 28, 2006, the disclosure of which is incorporated by reference herein in its entirety.

FIELD OF THE INVENTION

The present invention relates generally to a tool for chip removing machining of the type that includes a replaceable cutting insert and a basic body. The basic body includes a rear fixing part, a front supporting part having an insert seat in which the cutting insert is placed, and a tightening part situated over the support part and spaced-apart from the two other parts via two gaps. The tightening part is connected to the rest of the basic body via a joint made in the form of at least one elastically resilient material portion and having an axis around which the tightening part is pivotable in order to, by a front finger, be able to press the cutting insert against the insert seat. The fixing part includes an internal channel for feed of a fluid in the forward direction through the basic body. The invention also relates to a basic body for tools of the kind in question. The invention is particularly applicable and advantageous in connection with turning tools.

BACKGROUND OF THE INVENTION

Turning tools of the above generally mentioned type are usually used for machining workpieces of metal, preferably by parting, grooving and profile turning. For turning operations, it is desirable to use as slender cutting inserts as possible, in order to generate the thinnest possible grooves, thereby minimizing material losses and energy consumption. This means that the front portion of the support part under the cutting insert, as well as the front finger of the tightening part above the cutting insert have to be designed utmost slender or thin to be accommodated in the groove in the workpiece recessed by the cutting insert. In practice, therefore, the front portions of the support and tightening parts are blade-shaped, even if the rear portions of the parts may have a successively increasing thickness with the purpose of providing optimum stability of the cutting insert.

As a consequence of, on one hand, the fact that the front portions of the support and tightening parts have to be slender, and on the other hand, the fact that the movable tightening part exclusively is connected to the rest of the basic body via a thin, elastically resilient material portion serving as a joint for the tightening part, difficulties arise in cooling the cutting insert in an efficient way. Thus, the cooling of previously known turning tools of the kind in question has been effected in an inefficient and almost provisional way, more precisely by means of two pipe conduits routed from the rear fixing part of the basic body (or a tool holder connected with the same), situated externally to the basic body, and ending in outlets situated fairly far from the cutting insert. De facto, an upper conduit for cooling the cutting insert from above mouths approximately in flush with the topside of the tightening part, while a lower conduit intended for cooling the cutting insert from below mouths at a point situated approximately halfway between the cutting insert and the underside of the support part. In order to improve the cooling of the cutting insert and furthermore avoid the need of the space-requiring external pipe conduits and associated problems, attempts have been made to form the requisite cooling-liquid conduits in the form of internal channels in the proper basic body. However, these attempts have had limited success in that internal channels having a sufficient cross-section area indeed have been producible in the support part stiffly integrated with the fixing part, but not in the pivotably movable tightening part, which, with the exception of the thin, elastic joint, is spaced-apart from the fixing part as well as the support part via open gaps. In other words, it has previously only been practically possible to provide undercooling of the cutting inserts via internal cooling-liquid channels, but not overcooling.

Also, the cooling of the previously known tools has been effected using large quantities of flushing low-pressure liquid (about a pressure of 10 bar), in spite of the development of the cooling technique within the area of cutting machining increasingly being pushed in the direction of using high-pressure liquid. Thus, recently numerous tools for chip removing machining have been designed for cooling-liquid pressures within the range of 400-1000 bar or more.

SUMMARY OF THE INVENTION

The present invention aims at obviating the above-mentioned shortcomings of previously known cutting tools, in particular turning tools, and at providing an improved tool. Therefore, an object of the invention is to provide a tool having the capability of cooling the cutting insert in an efficient way not only from below but in particular also from above, without the tool needing to be cluttered up with external conduit pipes for the cooling liquid. An additional object is to provide a tool having the capability of cooling the topside of the cutting insert by means of a high-pressure liquid jet, which has accurate precision in respect of the point of impact thereof against the cutting insert. In particular, the invention aims at allowing the formation of a so-called hydraulic wedge between the chip surface of the cutting insert and the chip partly broken away, wherein the cooling effect of the jet of liquid even may be of secondary interest in comparison with the chip-breaking effect thereof. A parallel object of the invention is to provide an improved chip evacuation during grooving or parting by the tool. Yet another object of the invention is to provide a tool, the improved cooling and chip-forming capacity of which does not intrude on the capability of the tightening part to stably fix the cutting insert in the insert seat. In other words, a high-pressure liquid or fluid should be introducible into the tightening part without detrimentally affecting the delicate joint between the tightening part and the rest of the basic body.

In an embodiment, the invention provides a tool for chip removing machining, including a replaceable cutting insert and a basic body. The basic body includes a rear fixing part, a front supporting part having an insert seat, and a tightening part situated over the support part, and spaced-apart from the front supporting part by a first gap and from the rear fixing part by a second gap. The tightening part is connected to the basic body via a joint. The joint is formed of at least one elastically resilient material portion and has an axis around which the tightening part is pivoted in order to press the cutting insert against the insert seat by a front finger. The rear fixing part includes an internal channel for feed of a fluid in the forward direction through the basic body. The internal channel extends into a second channel inside the tightening part via a channel section that is entirely or partly housed in a bridge which, like the joint, is formed of the material in the basic body, and which bridges one of the first and second gaps.

In another embodiment, the invention provides a basic body for a tool for chip removing machining, including a rear fixing part, a front supporting part having an insert seat, and a tightening part situated over the support part, and spaced-apart from the front supporting part by a first gap and from the rear fixing part by a second gap. The tightening part is connected to the basic body via a joint. The joint is formed of at least one elastically resilient material portion and has an axis around which the tightening part is pivoted. The rear fixing part includes an internal channel for feed of a fluid in the forward direction through the basic body. The internal channel extends into a second channel inside the tightening part via a channel section that is entirely or partly housed in a bridge which, like the joint, is formed of the material in the basic body, and bridges one of the first and second gaps.

The idea behind the invention is to lead in a liquid or fluid, in particular high-pressure liquid, into the pivotably movable tightening part of the tool via a channel section that is entirely or partly housed in a bridge, which like the joint is formed of the proper material in the basic body, and which crosses or bridges one of the two gaps, more precisely in a locus spaced apart from the axis of the joint around which the tightening part is pivotable. By providing a channel inside the tightening part and connecting the same with a traditional channel in the fixing part via a bridge that is at least somewhat thicker or sturdier than the material portion that forms the joint for the tightening part, the channel system in its entirety can be given a cross-section area that is sufficiently large to feed the requisite amounts of liquid to the front finger of the tightening part and further toward the topside of the cutting insert. By the fact that the bridge is placed on a great distance from the finger of the tightening part and is given a limited width, the material in the bridge can be strained sufficiently to allow the finger of the tightening part to move the short distance (a few tenths of a millimeter) required to clamp the cutting insert stably.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
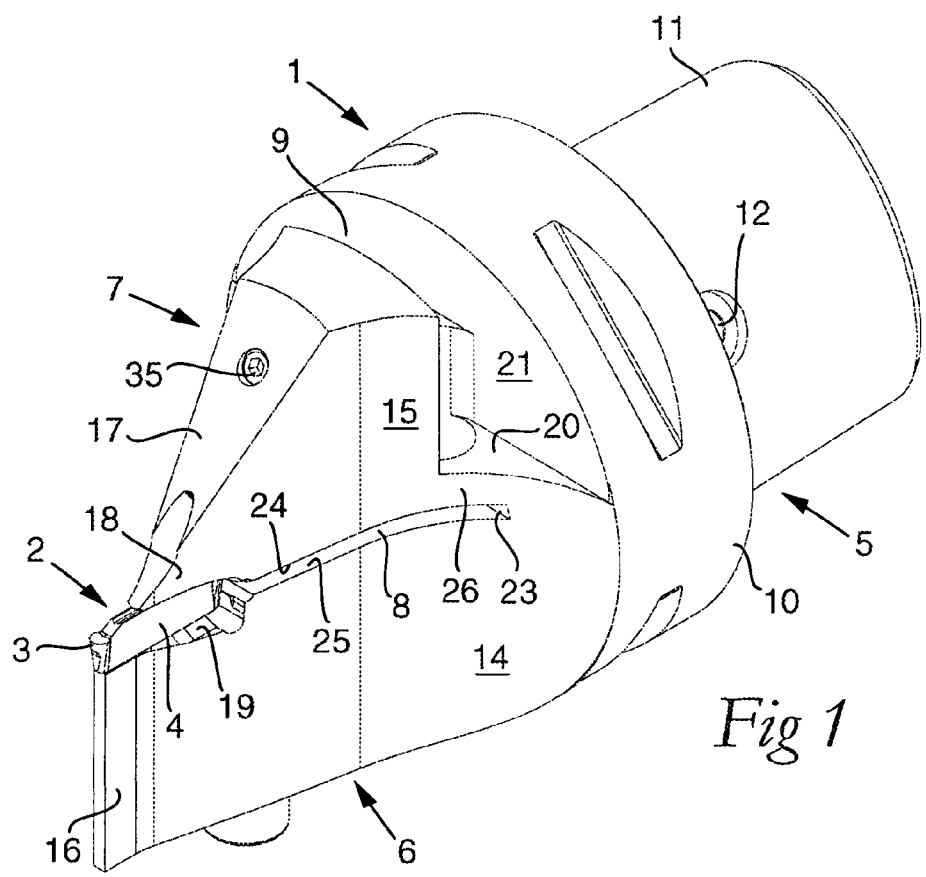
FIG. 1 is a perspective view of a tool according to an embodiment of the invention in the form of a turning tool.

The turning tool shown in FIGS. 1-5, which in practice can be used for parting, grooving and profile turning, includes two main components, viz. a basic body in its entirety designated 1, and a replaceable cutting insert 2. In this case, the cutting insert 2 has an elongate basic shape and is indexable in two positions by including a pair of opposite, circular cutting edges 3, which are formed on round material portions having a downwardly tapering shape. The flat intermediate portion 4 of the cutting insert, which extends between the two opposite ends, has a thickness that is smaller than the diameter of the cutting edges 3.

Suitably, the cutting insert 2 is manufactured from cemented carbide or another hard and wear-resistant material, while the basic body 1 is manufactured from steel or an equivalent material of the type that has at least a certain inherent elasticity.

The basic body 1 includes a rear fixing part 5, a front supporting part 6, and a tightening part 7 situated above the support part 6 and in front of the fixing part 5. A first, substantially horizontal gap 8 separates the tightening part 7 from the support part 6, while a second, vertical gap 9 separates the tightening part from the fixing part 5. In the fixing part 5, in this case there is included a front, sturdy collar 10, as well as a rearwardly directed male member 11 insertable in a cooperating seating in a machine tool or tool holder. In this case, the male member 11 is included in a coupling of the type that is commercially available under the trademark COROMANT CAPTO®. Inside the fixing part 5, a system of channels is formed to which cooling liquid, in particular high-pressure cooling liquid, can be supplied via one or more inlets 12. One of said channels is indicated by dashed lines at 13 in FIG. 2 (see also FIG. 4).

As illustrated in FIG. 1, the rear portions of the support part 6, as well as the tightening part 7, are fairly wide and sturdy. However, by being delimited by concave limiting surfaces 14, 15, the parts taper in the forward direction. More precisely, the support part 6 ends in a thin, leaf-like portion 16 having a comparatively great height (as a consequence of the fact that the underside of the support part 6 is essentially parallel to the gap 8). The tightening part 7 tapers not only in the horizontal plane, but also in the vertical plane due to the presence of a limiting surface 17 sloping downward/forward, so as to be terminated by a wedge-shaped finger 18 having the purpose of clamping the cutting insert 2 against an insert seat 19 in the support part 6.

Figure 2:
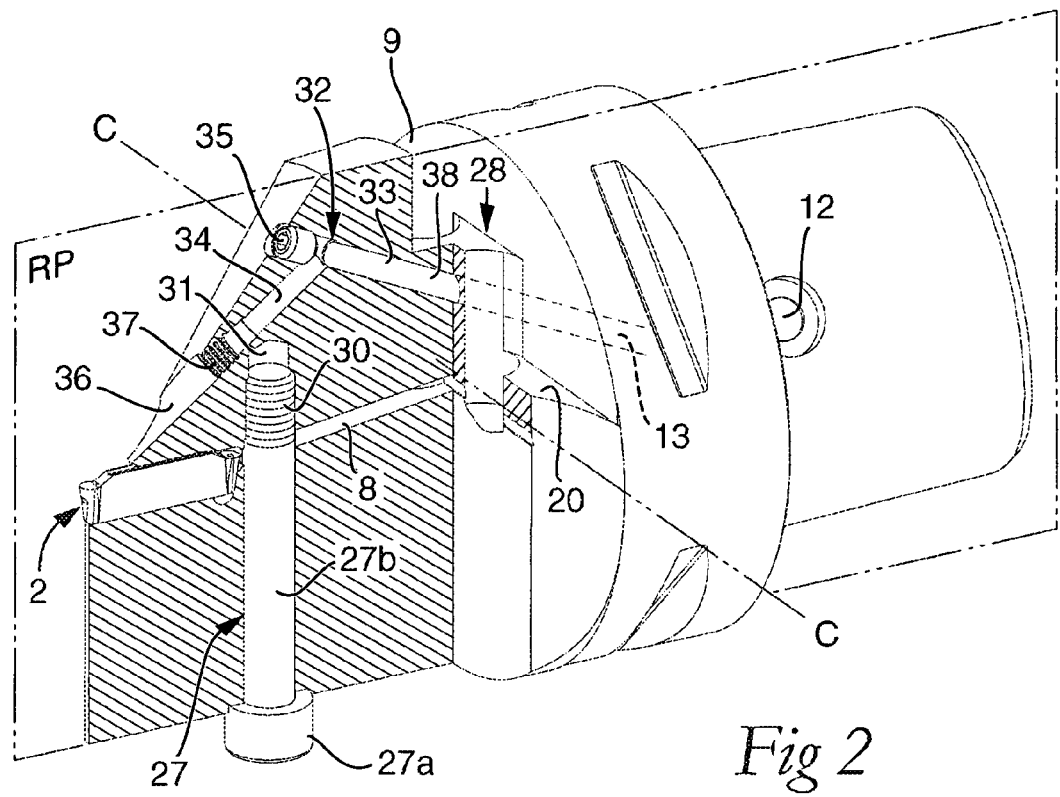
FIG. 2 is a partially sectioned perspective view of the tool in FIG. 1.
Figure 3:
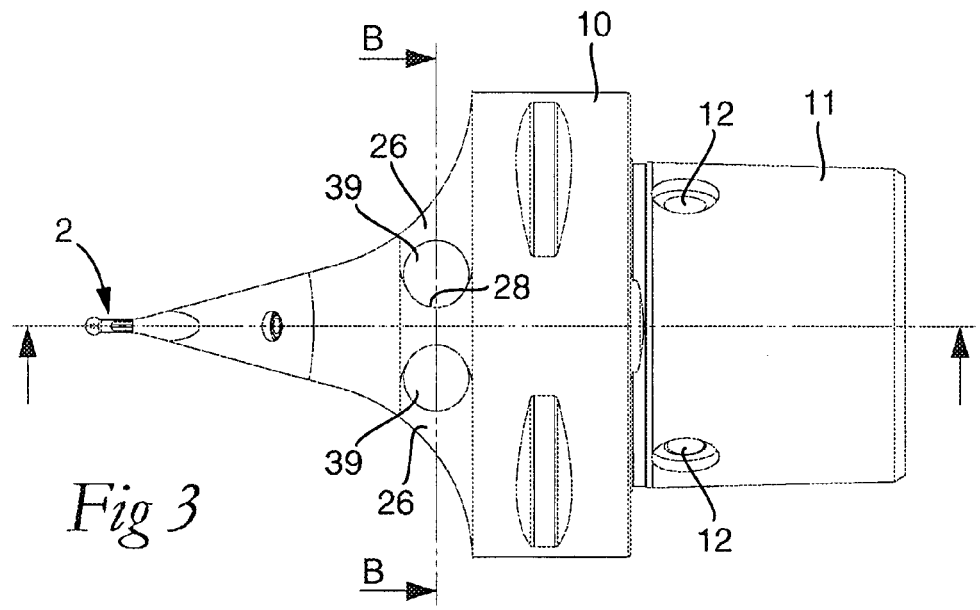
FIG. 3 is a plan view from above of the tool in FIG. 1.
Figure 4:
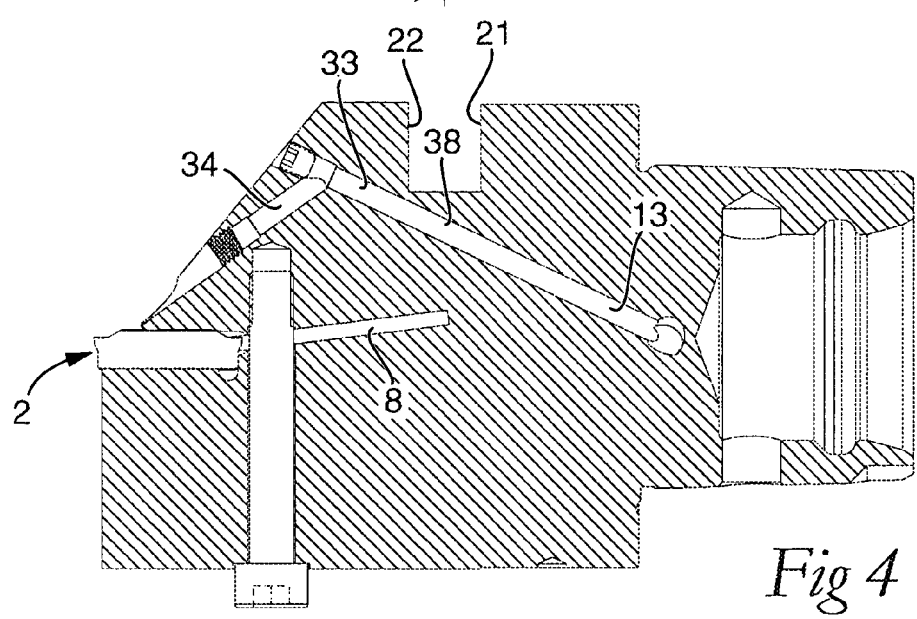
FIG. 4 is a through longitudinal section A-A in FIG. 3.
Figure 5:
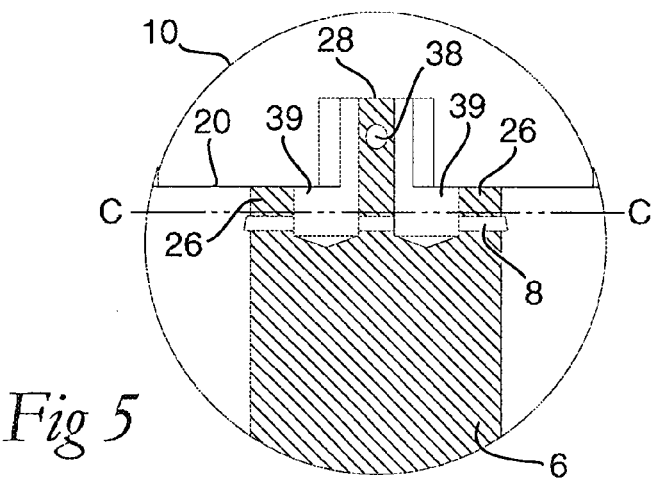
FIG. 5 is a cross section B-B in FIG. 3.

The vertical gap 9 is delimited by a bottom surface 20 and two opposite, vertical surfaces 21, 22 (see also FIG. 4). The horizontal gap 8, in turn, is delimited by an inner end surface 23, as well as upper and lower limiting surfaces 24, 25. The last-mentioned surfaces are suitably plane and mutually parallel, the inner end surface 23 being straight (e.g., plane) and extending between the opposite, concave side surfaces of the basic body. More precisely, the end surface 23 extends perpendicularly to the central reference plane RP (see FIG. 2) that divides the tool into two identical, although mirror-inverted halves. As illustrated in FIG. 1, the horizontal gap 8 extends a distance under the bottom surface 20 of the vertical gap 9. In such a way, the surfaces 20, 24 delimit a comparatively thin material portion 26 having a generally rectangular cross-section shape. Due to the inherent elasticity of the steel or basic-body material, the material portion 26 is elastically resilient and can serve as a joint around which the tightening part 7 can pivot. In FIG. 2, C-C designates an axis that extends substantially centrally through the material portion 26 and is oriented perpendicularly to the reference plane RP. In a geometrical respect, the axis C-C is the joint around which the tightening part 7 can pivot.

In this case, pivoting of the tightening part is provided for by a tightening element in the form of a screw, more precisely a tension screw 27, built-in in the basic body. In addition to a head 27a, the screw includes a cylindrical shank 27b having a male thread 30. The major part of the shank 27b extends through a through hole in the support part 6, the male thread 30 at the free end of the shank being in engagement with a female thread in a downwardly opening hole 31 in the tightening part 7.

A problem in tools of the kind in question is that the elastically resilient material portion 26, which should serve as a joint for the tightening part, cannot be dimensioned too sturdy, since the same then would become comparatively rigid. In practice, the material portion in question has therefore not been capable of accommodating any channel having a sufficient cross-section area for an acceptable cooling-liquid supply, particularly if the channel has to be oriented at an angle to the plane surfaces that delimit the material portion.

The tool according to an embodiment of the invention includes a bridge 28 that is formed in one of the two gaps that delimit the tightening part 7 from the rest of the basic body. In the example shown, the bridge 28 is formed in the vertical gap 9 and extends between the two side limiting surfaces 21, 22 thereof, the bridge having the purpose of allowing connection of the channel 13 with a channel built-in in the tightening part 7, which in its entirety is designated 32. As illustrated in FIGS. 2 and 4, the channel 32 includes two straight bores 33, 34, which communicate mutually and are oriented at an angle to each other. More precisely, the two bores diverge from the point of connection thereof at an obtuse angle, which in the example amounts to about 120°. At a free outer end, the bore 33 is closed by means of a plug 35. The bore 34 extends up to an outlet opening 36 in the finger 18 of the tightening part, and includes, in this case, a high-pressure nozzle 37 by which a fine high-pressure liquid jet can be directed with high accuracy at a desired angle and with a desired point of impact against the active cutting edge 3 of the cutting insert.

With reference to FIG. 4, the bore 33 included in the channel 32 in practice is an extension of the straight bore that forms or is included in the channel 13, the channel sections 13, 33 transforming into each other via a short channel section 38 situated inside the bridge 28. In practice, the channel sections 13, 38, 33 are suitably produced via a single drilling operation.

As illustrated in FIGS. 1, 2 and 4, the vertical gap 9 is considerably wider than the horizontal gap 8 (in this case about 5 times wider). In the shown, embodiment, the bridge 28 is centrally placed in the gap 9 so that the reference plane RP divides the bridge into two similar halves. On opposite sides of the bridge 28, in the example according to FIGS. 1-5, there are formed hollow spaces 39. The same extend continuously between the bottom surface 20 of the gap 9 and the part of the upper limiting surface 24 of the gap 8 that connects to the rear end surface 23 of the gap 8. In practice, the hollow spaces 39 are produced by drilling. In such a way, the elastic joint of the tightening part will be formed of two webs 26 spaced-apart along the axis C-C and not only axially spaced-apart from each other, but also from the centrally situated bridge 28. When the tightening part 7 is pivoted around the axis C-C (by means of the tightening screw 27), the webs 26 will bend at the same time as the material in the upper part of the bridge 28 is strained. In this connection, it should be emphasized that the distance the finger 18 needs to move in order to reliably clamp the cutting insert 2 is very limited. In practice, it is thus sufficient that the finger is pressed down about 0.2 mm. Because the tightening screw 27 is situated on a comparatively great distance from the axis C-C, the same will subject the tightening part to a downwardly directed tensile force with a levering action, which is fully sufficient to deflect the material in the webs 26 at the same time as the material in the upper part of the bridge 28 is strained to a sufficient extent to allow the pivoting motion. Because the bridge is situated in the immediate vicinity of the axis C-C, the strain does need not to be greater than some hundredths of a millimeter.

Figure 6:
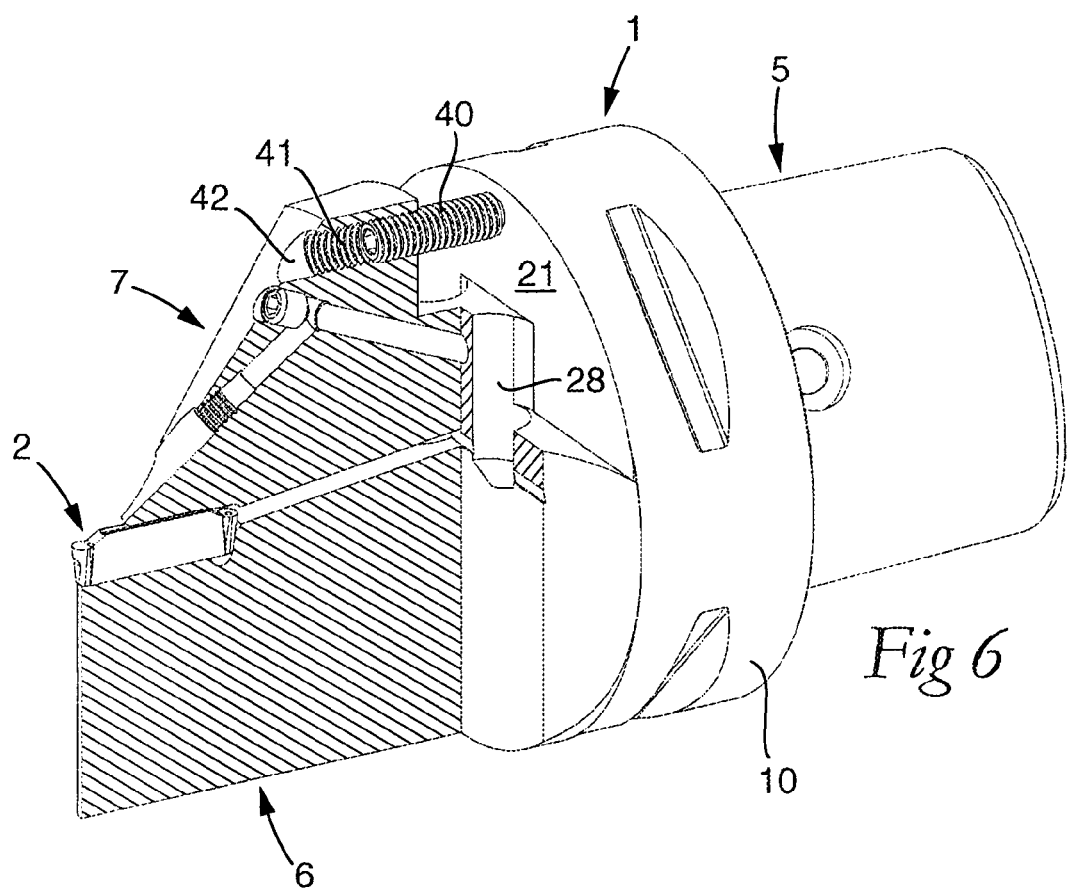
FIG. 6 is a partly sectioned perspective view showing an alternative embodiment of the tool according to the invention.

Reference is now made to FIG. 6, which illustrates an alternative embodiment of the tool in which a pressure screw 40 is utilized as a tightening element for the tightening part 7. A male thread of the screw is in engagement with a female thread 41 in a hole 42 through the upper portion of the tightening part 7, a rear end of the screw being pressed against the surface 21 on the collar 10 of the fixing part. Upon tightening of the screw, the tightening part will be subjected to a compressive force that compels the finger 18 to be pressed against the cutting insert.

Figure 7:
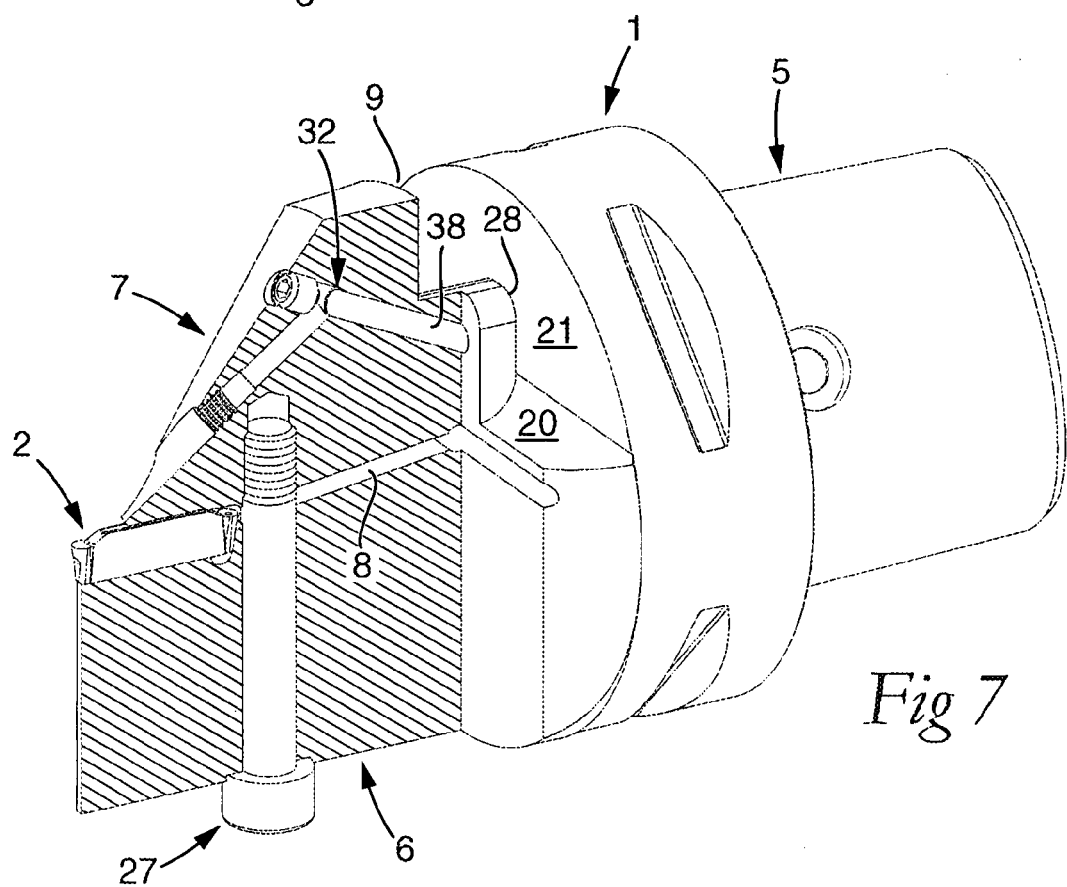
FIG. 7 is an analogous perspective view showing another alternative embodiment of the tool.
Figure 8:
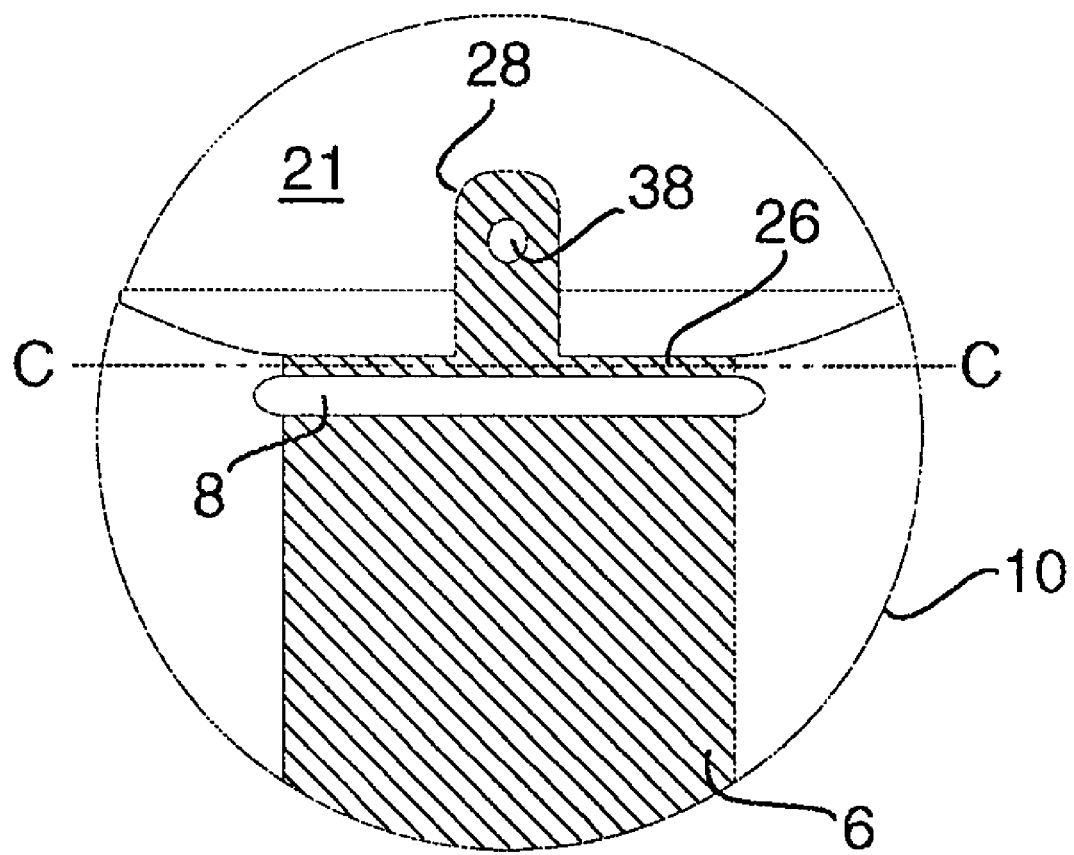
FIG. 8 is a cross-section corresponding to FIG. 5 through the tool of FIG. 7.

In the embodiment shown in FIGS. 7 and 8, the borings or the hollow spaces adjacent to the bridge 28 have been eliminated. In such a way, there is provided a continuous joint portion 26 along the entire width of the gap 8 in the section in question, the bridge 28 being in the form of a material portion that is integrated with the joint portion 26 and projects into the gap 9 in the upward direction from the joint portion. Also in this case, the bridge yields partially by strain when the joint portion is deflected to allow pivoting of the tightening part.

A fundamental advantage of the tool according to the invention is that a cooling liquid or fluid can be fed internally in the tightening part in order to form a jet in the front finger, which jet, with high accuracy and at a high pressure, can be directed toward the edge portion of the cutting insert at a desired angle to the same. The described solution is particularly advantageous when high-pressure liquid is to be applied to the cutting insert, because a high-pressure nozzle can be fitted centrally behind the cutting edge and at a desired angle to the same. Furthermore, the need of external liquid conduits is completely eliminated, because the requisite channels run internally through the basic body without being exposed to even the two gaps delimiting the tightening part. What is more, the tool can be manufactured using simple and well-tried chip-removing machining methods. Accordingly, the bridge for the channel transition and the surrounding gap can be produced by contour milling and drilling. Furthermore, the channels can be provided by means of straight, drilled bores, besides which the gap that lacks a bridge can be made by simple linear milling, e.g., using a slitting cutter or a blade.

While the invention has been disclosed with reference to certain preferred embodiments, numerous modifications, alterations, and changes to the described embodiments are possible without departing from the sphere and scope of the invention, as defined in the appended claims and equivalents thereof. For example, it is possible to place the channel bridge in the horizontal gap that separates the tightening part from the support part. Furthermore, the design of the channel bridge in respect of shape as well as dimensions can be varied within wide limits, together with the design and position of the channels inside the basic body. For instance, the straight channel bore, which via the bridge extends into the rear fixing part, could be oriented at a steeper angle than the bore shown in the embodiment examples. A particularly steep angle could be realizable if the bridge is located in the horizontal gap instead of the vertical one. Furthermore, the invention is applicable to such tools that in one and the same basic body include more than one tightening part, e.g., two diametrically opposed tightening parts for the fixation of a cutting insert each, which are located in opposite insert seats on a common support part. Furthermore, the short intermediate section of the channel that runs via the gap may be made partly in a bridge, partly in the joint. In such a way, the size of the bridge can be reduced to a minimum. Accordingly, it is intended that the invention not be limited to the described embodiments, but that it have the full scope defined by the language of the following claims.

What is claimed is:

1. A tool for chip removing machining, comprising: a replaceable cutting insert and a basic body, the basic body including,
    a rear fixing part;
    a front supporting part having an insert seat; and
    a tightening part situated over the support part, and spaced-apart from the front supporting part by a first gap and from the rear fixing part by a second gap, the tightening part being connected to the basic body via a joint;
    the joint being formed of at least one elastically resilient material portion and having an axis around which the tightening part is pivoted in order to press the cutting insert against the insert seat by a front finger;
    the rear fixing part including an internal channel for feed of a fluid in the forward direction through the basic body;
    wherein the internal channel extends into a second channel inside the tightening part via a channel section that is entirely or partly housed in a bridge which, like the joint, is formed of the material in the basic body, and which bridges one of the first and second gaps.

2. The tool according to claim 1, wherein the bridge is located in the second gap that separates the tightening part from the fixing part.

3. The tool according to claim 2, wherein the bridge is centrally disposed halfway between opposite ends of the gap.

4. The tool according to claim 2, wherein hollow spaces are formed on opposite sides of the bridge that extend continuously between the first and second gaps and separate the bridge from two axially spaced-apart webs, which together form the joint around which the tightening part is pivoted.

5. The tool according to claim 4, wherein the hollow spaces are cylindrical borings.

6. The tool according to claim 1, wherein the second channel includes two mutually communicating, straight bores, which are oriented at an angle to each other, a first one of which runs in the extension of a straight bore included in the first channel in the fixing part, and is plugged at a free end, the second one of which extends from the first one to a mouth in the finger of the tightening part.

7. The tool according to claim 6, wherein a high-pressure nozzle is arranged in the mouth of the second bore.

8. The tool according to claim 1, wherein the tightening part is pivoted by means of a tightening element built-in in the basic body.

9. The tool according to claim 8, wherein the tightening element is a tension screw.

10. The tool according to claim 9, wherein the tension screw includes a head and a shank, which is fitted in a through hole in the support part, and includes a male thread that is in engagement with a female thread in a downwardly opening hole in the tightening part.

11. The tool according to claim 8, wherein the tightening element is a pressure screw.

12. The tool according to claim 11, wherein the pressure screw includes a male thread that is in engagement with a female thread in a through hole in an upper portion of the tightening part, and that an end of the pressure screw is pressed against the fixing part.

13. The tool according to claim 1, wherein the second gap that separates the tightening part from the fixing part is wider than the first gap that separates the tightening part from the support part, and the material portion constituting the joint is delimited between a bottom surface in the second gap and an upper surface that delimits the first gap.

14. A basic body for a tool for chip removing machining, comprising:
    a rear fixing part;
    a front supporting part having an insert seat; and
    a tightening part situated over the support part, and spaced-apart from the front supporting part by a first gap and from the rear fixing part by a second gap, the tightening part being connected to the basic body via a joint;
    the joint being formed of at least one elastically resilient material portion and having an axis around which the tightening part is pivoted;
    the rear fixing part including an internal channel for feed of a fluid in the forward direction through the basic body;
    wherein the internal channel extends into a second channel inside the tightening part via a channel section that is entirely or partly housed in a bridge which, like the joint, is formed of the material in the basic body, and bridges one of the first and second gaps.

* * * * *